United States Patent Office.

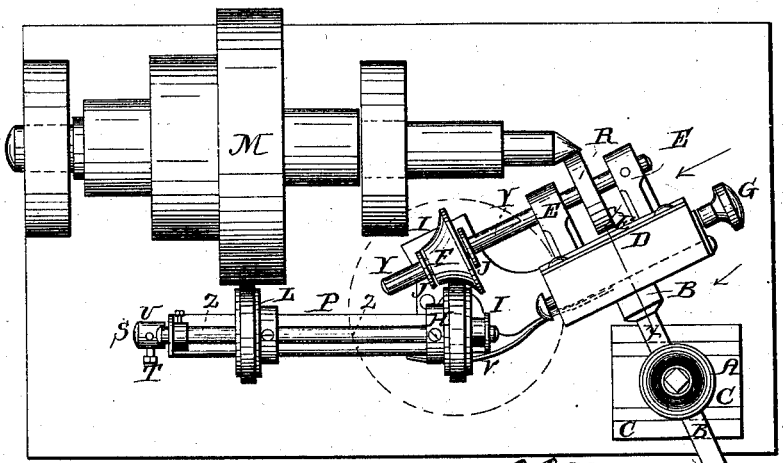
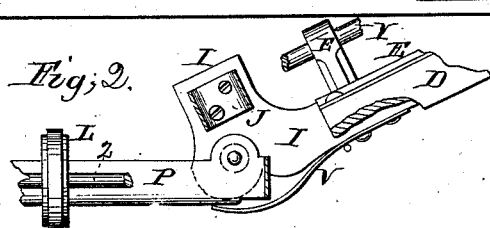
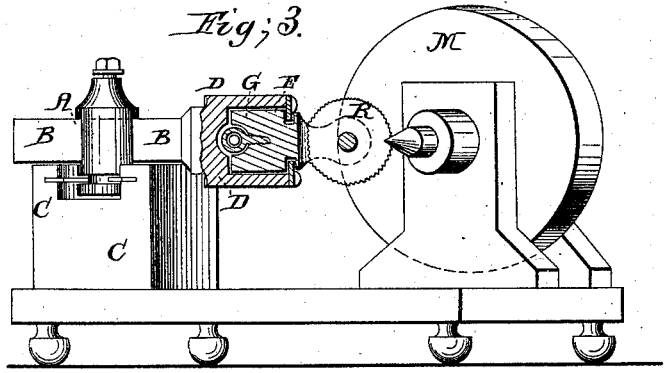

CHARLES COESTER, JR., AND A. B. LAWTHER, OF BRIDGEPORT, CONNECTICUT.

*Letters Patent No. 68,698, dated September 10, 1867.*

IMPROVEMENT IN MACHINES FOR GRINDING LATHE-ARBORS.

The Schedule referred to in these Letters Patent and making part of the same.

TO ALL WHOM IT MAY CONCERN:

Be it known that we, CHARLES COESTER, Jr., and A. B. LAWTHER, of Bridgeport, in the county of Fairfield, and State of Connecticut, have invented a new and improved Grinding Attachment for Lathes; and we do hereby declare that the following is a full, clear, and exact description thereof, which will enable others skilled in the art to make and use the same, reference being had to the accompanying drawings, forming part of this specification, in which—

Figure 1 is a top or plan view of our improved apparatus.

Figure 2 is a detail horizontal section of the part included within the red dotted line in fig. 1.

Figure 3 is a detail sectional view of the same, taken through the line $x\ x$, fig. 1.

Similar letters of reference indicate like parts.

Our invention has for its object to furnish an easy and convenient means by which a grinding-wheel may be applied to an ordinary lathe; and it consists in the combination of the pivoted extension-plate or arm and the plate to which the bearings are attached for the grinding-wheel shaft, with the adjustable supports, the spring for holding the extension-plate and arm toward the cone-pulley, the adjustable tool-holder post, the grooved bed upon the supporting-plate, having a shank fitting into the tool-holder post, the sliding carriage, the friction-pulleys, and the grinding-wheel, whereby the angle at which the grinding-wheel is applied to the mandrel is adjusted as will be hereinafter described.

R is the grinding-wheel, which is attached to the shaft Y, revolving in bearings in the arms of the sliding carriage E. The carriage E is moved back and forth in the grooved bed D by the feed-screw G or its equivalent. The bed D is provided with a shank, B, by which the whole grinding fixture is attached to the tool-post or holder A, and base C of the lathe I is a plate or arm securely attached to the bed-block D, and to which are attached bearings J for the grinding-wheel shaft Y. F is a concave pulley placed upon the shaft Y between the bearings J. The pulley F is provided with a tongue or feather, which enters a groove in the shaft Y, so that the said pulley may carry the said shaft with it in its revolution, and at the same time allow the shaft to move freely through it longitudinally. Z is an extension-shaft, which revolves in bearings formed upon or attached to the extension-bar P, one end of which is pivoted to the plate or arm I, as shown in fig. 2, and its other is adjustably secured to the supporting-post S by the adjusting-screw U and set-screw T. L is a friction-pulley, adjustably secured to the shaft Z by a set-screw, and which receives motion from the cone-pulley M of the lathe. H is a friction-pulley attached to the shaft Z in such a position as to be in contact with the concave pulley F, to impart motion to it, and through it to the grinding-wheel R. V is a spring, one end of which is attached to the plate or arm I, and its other end rests against the rear edge of the extension-bar P, as shown in figs. 1 and 2, to hold the pulley L up against the cone-pulley M.

What we claim as new, and desire to secure by Letters Patent, is—

The extension-plate P and supporting-plate I, pivoted together, in combination with the adjustable supports S C and spring V, tool-holder A, grooved bed D, having shank B, sliding carriage E, friction-pulleys L H F, and grinding-wheel R, whereby the angle at which the grinding-wheel is applied to the mandrel is adjusted, substantially as described, for the purpose specified.

CHAS. COESTER, Jr.,
A. B. LAWTHER.

Witnesses:
H. T. BLAKE,
PHILO F. BARNUM.